(12) United States Patent
Makihara et al.

(10) Patent No.: US 10,968,306 B2
(45) Date of Patent: Apr. 6, 2021

(54) BOUND STOPPER AND PRODUCTION METHOD THEREFOR

(71) Applicants: BASF INOAC Polyurethanes Ltd., Shinshiro (JP); TOYOTA JIDOSHA KABUSHIKI KAISHA, Toyota (JP)

(72) Inventors: Nobuyuki Makihara, Shinshiro (JP); Yoshikatsu Hatakeyama, Toyota (JP)

(73) Assignees: BASF INOAC Polyurethanes Ltd., Aichi-ken (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 109 days.

(21) Appl. No.: 16/155,446

(22) Filed: Oct. 9, 2018

(65) Prior Publication Data
US 2019/0106526 A1   Apr. 11, 2019

(30) Foreign Application Priority Data

Oct. 11, 2017  (JP) .............................. JP2017-197484

(51) Int. Cl.

| | |
|---|---|
| *C08G 18/10* | (2006.01) |
| *B29C 45/00* | (2006.01) |
| *B29C 44/02* | (2006.01) |
| *B60G 11/22* | (2006.01) |
| *C08G 18/64* | (2006.01) |
| *B29C 44/58* | (2006.01) |
| *F16F 9/58* | (2006.01) |
| *C08G 18/40* | (2006.01) |
| *C08G 83/00* | (2006.01) |
| *C08G 18/48* | (2006.01) |
| *C08G 18/76* | (2006.01) |
| *C08G 18/42* | (2006.01) |
| *B60G 15/06* | (2006.01) |
| *C08G 101/00* | (2006.01) |
| *B29K 75/00* | (2006.01) |
| *B29K 105/00* | (2006.01) |
| *B29K 105/04* | (2006.01) |
| *B29L 31/30* | (2006.01) |

(Continued)

(52) U.S. Cl.
CPC .............. *C08G 18/10* (2013.01); *B29C 44/02* (2013.01); *B29C 44/58* (2013.01); *B29C 45/0001* (2013.01); *B60G 11/22* (2013.01); *B60G 15/065* (2013.01); *C08G 18/4081* (2013.01); *C08G 18/4238* (2013.01); *C08G 18/4854* (2013.01); *C08G 18/64* (2013.01); *C08G 18/6484* (2013.01); *C08G 18/7678* (2013.01); *C08G 83/007* (2013.01); *F16F 9/58* (2013.01); *B29C 44/42* (2013.01); *B29K 2075/00* (2013.01); *B29K 2105/0002* (2013.01); *B29K 2105/04* (2013.01); *B29K 2995/0063* (2013.01); *B29K 2995/0077* (2013.01); *B29K 2995/0089* (2013.01); *B29K 2995/0091* (2013.01); *B29L 2031/30* (2013.01); *B29L 2031/774* (2013.01); *B60G 2202/143* (2013.01); *B60G 2204/45021* (2013.01); *B60G 2206/81012* (2013.01); *C08G 2101/005* (2013.01); *C08G 2101/0008* (2013.01); *C08G 2101/0066* (2013.01); *C08G 2101/0083* (2013.01); *C08G 2350/00* (2013.01)

(58) Field of Classification Search
CPC ......... B29C 44/02; B29C 44/42; B29C 44/58; B29C 44/60; B29C 45/0001; B29K 2075/00; B29K 2105/0002; B29K 2105/04; B29K 2995/0063; B29K 2995/0077; B29K 2995/0089; B29K 2995/0091; B29L 2031/30; B29L 2031/774; B60G 11/22; B60G 15/065; B60G 2202/143; B60G 2204/45021; B60G 2206/81012; C08G 18/10; C08G 18/12; C08G 18/4009; C08G 18/4081; C08G 18/4238; C08G 18/4854; C08G 18/64; C08G 18/6484; C08G 18/7678; C08G 83/007; F16F 1/3732; F16F 9/58
See application file for complete search history.

(56) References Cited

U.S. PATENT DOCUMENTS

| | | | |
|---|---|---|---|
| 9,914,813 | B2 | 3/2018 | Takemoto et al. |
| 2014/0374976 | A1 | 12/2014 | Yang et al. |

(Continued)

FOREIGN PATENT DOCUMENTS

| | | |
|---|---|---|
| CN | 104024298 A | 9/2014 |
| CN | 106164119 A | 11/2016 |

(Continued)

OTHER PUBLICATIONS

Communication dated Sep. 24, 2019, from the Japanese Patent Office in counterpart application No. 2017-197484.

(Continued)

*Primary Examiner* — John M Cooney
(74) *Attorney, Agent, or Firm* — Sughrue Mion, PLLC

(57) ABSTRACT

The present invention is to provide a bound stopper, which has high mechanical strength, is excellent in durability against fatigue breaking, settling or the like when a heavy load is repeatedly received, and is easy to be produced, in which the bound stopper comprises a polyurethane foam obtained from a polyurethane foam composition containing an isocyanate component and a blowing agent, and the isocyanate component contains a urethane prepolymer having an isocyanate group, the urethane prepolymer being obtained from a polyol component, a polyrotaxane containing a cyclic molecule having an active hydrogen group as a constituent, and an isocyanate.

5 Claims, 7 Drawing Sheets

(51) Int. Cl.
  *B29L 31/00* (2006.01)
  *B29C 44/42* (2006.01)

(56) References Cited

U.S. PATENT DOCUMENTS

| | | | |
|---|---|---|---|
| 2016/0304689 A1* | 10/2016 | Takemoto | C08J 9/0061 |
| 2016/0304690 A1* | 10/2016 | Takemoto | C08G 18/6484 |
| 2016/0347140 A1 | 12/2016 | Suzuki et al. | |
| 2019/0263961 A1* | 8/2019 | Shimizu | C08G 18/7614 |

FOREIGN PATENT DOCUMENTS

| | | | |
|---|---|---|---|
| JP | 2004-293697 A | 10/2004 |
| JP | 2015-183832 A | 10/2015 |
| JP | 2016-204434 A | 12/2016 |

OTHER PUBLICATIONS

Communication dated Jul. 17, 2020, from China National Intellectual Property Administration in Chinese Application No. 201811180909.4.

* cited by examiner

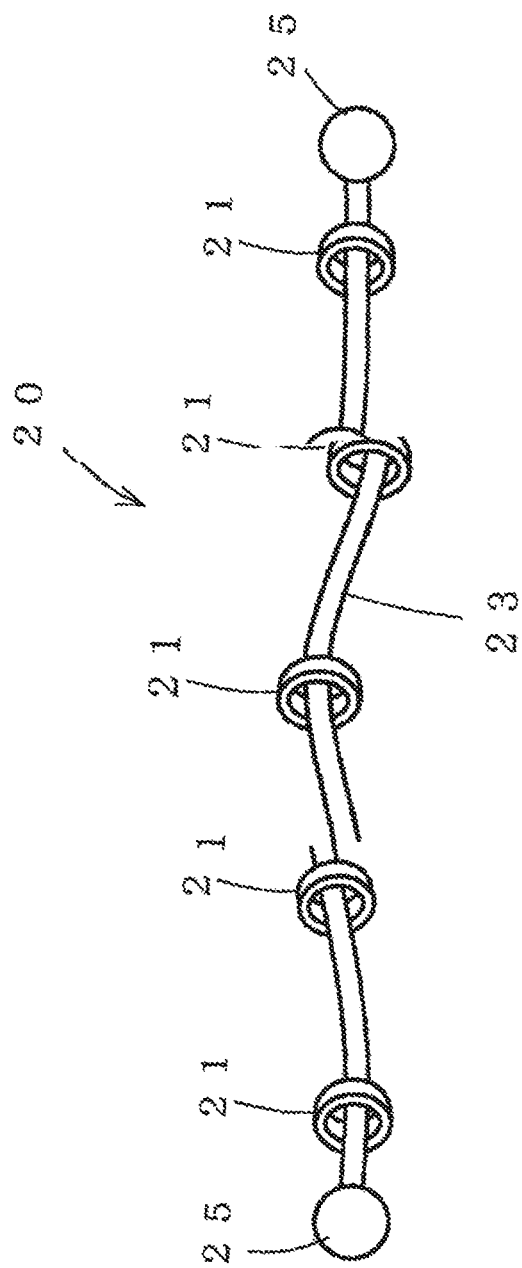

FIG. 5

| | | | Unit | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Prepolymer | Blending ratio | Polyol 1 | g | 10000 | 10000 | 10000 | | 10000 | 10000 | 10000 | 10000 | 10000 | 10000 |
| | | Polyol 2 | g | | | | 10000 | | | | | | |
| | | Polyrotaxane | g | 20 | 50 | 100 | 100 | 300 | 500 | 600 | 100 | 100 | 100 |
| | | Isocyanate | g | 3000 | 3000 | 3000 | 3000 | 3000 | 3000 | 3000 | 3000 | 3000 | 3000 |
| | NCO% (theoretical value) | | % | 5.98 | 5.95 | 5.91 | 5.91 | 5.72 | 5.54 | 5.45 | 5.91 | 5.91 | 5.91 |
| | Amount | | g | 100 | 100 | 100 | 100 | 100 | 100 | 100 | 100 | 100 | 100 |
| Foaming liquid | Amount | | g | 2.33 | 2.32 | 2.30 | 2.30 | 2.23 | 2.16 | 2.12 | 2.30 | 2.30 | 2.30 |
| Polyrotaxane | Amount | | g | | | | | | | | | | |
| Index | | | | 110 | 110 | 110 | 110 | 110 | 110 | 110 | 110 | 110 | 110 |
| Injection amount to mold for test piece | | | g | 330 | 330 | 330 | 330 | 330 | 330 | 330 | 178 | 205 | 264 |
| Injection amount to product mold | | | g | 76 | 76 | 76 | 76 | 76 | 76 | 76 | 41 | 47 | 61 |
| Physical properties | Test piece | Density | g/cm³ | 0.50 | 0.50 | 0.50 | 0.50 | 0.50 | 0.50 | 0.50 | 0.27 | 0.31 | 0.40 |
| | | Tensile strength | MPa | 5.2 | 5.4 | 5.5 | 5.5 | 5.7 | 5.9 | 6.0 | 3.9 | 4.6 | 5.2 |
| | | Elongation | % | 320 | 320 | 330 | 330 | 350 | 360 | 370 | 230 | 280 | 310 |
| | Product | Compressive residual strain | % | 13 | 12 | 12 | 12 | 12 | 12 | 11 | 18 | 14 | 13 |
| | | Repeated compressive strain (5 KN × 1 HZ) | Time | 90,000 | 100,000 or more | 100,000 or more | 100,000 or more | 100,000 or more | 100,000 or more | 100,000 or more | 85,000 | 90,000 | 100,000 or more |
| | | | Determination | B | A | A | A | A | A | A | C | B | A |

FIG. 6

| | | Unit | Example | | | | | | | Comparative Example | | |
|---|---|---|---|---|---|---|---|---|---|---|---|---|
| | | | 11 | 12 | 13 | 14 | 15 | 16 | 1 | 2 | 3 |
| Prepolymer | Polyol 1 (Blending ratio) | g | 10000 | 10000 | 10000 | 10000 | 10000 | 10000 | 10000 | 10000 | 10000 |
| | Polyol 2 (Blending ratio) | g | | 100 | 100 | 100 | 100 | 100 | | | |
| | Polyrotaxane | g | 100 | | | | | | | | |
| | Isocyanate | g | 3000 | 3550 | 3380 | 2350 | 2000 | 1900 | 3000 | 3000 | 3000 |
| | NCO% (theoretical value) | % | 5.91 | 7.28 | 6.87 | 4.13 | 3.09 | 2.78 | 6.00 | 6.00 | 6.00 |
| | Amount | g | 100 | 100 | 100 | 100 | 100 | 100 | 100 | 100 | 100 |
| Foaming liquid | Amount | g | 2.30 | 2.83 | 2.67 | 1.61 | 1.20 | 1.08 | 2.34 | 2.34 | 2.34 |
| Polyrotaxane | Amount | g | | | | | | | | 0.8 | 2 |
| Index | | | 110 | 110 | 110 | 110 | 110 | 110 | 110 | 110 | 110 |
| Injection amount to mold for test piece | | g | 396 | 330 | 330 | 330 | 330 | 330 | 330 | 330 | 330 |
| Injection amount to product mold | | g | 91 | 76 | 76 | 76 | 76 | 76 | 76 | 76 | 76 |
| Physical properties | Test piece | Density | g/cm³ | 0.60 | 0.50 | 0.50 | 0.50 | 0.50 | 0.50 | 0.50 | 0.50 | 0.50 |
| | | Tensile strength | MPa | 5.8 | 4.3 | 5.3 | 5.4 | 5.1 | 4.7 | 5.0 | 5.0 | 4.9 |
| | | Elongation | % | 370 | 240 | 310 | 320 | 310 | 240 | 300 | 300 | 290 |
| | | Compressive residual strain | % | 10 | 14 | 12 | 12 | 13 | 15 | 15 | 15 | 15 |
| | Product | Repeated compressive strain (5 KN × 1 HZ) | Time | 100,000 or more | 85,000 | 90,000 | 100,000 or more | 90,000 | 85,000 | 70,000 | 70,000 | 70,000 |
| | | Determination | | A | C | B | A | B | C | D | D | D |

BOUND STOPPER AND PRODUCTION METHOD THEREFOR

CROSS REFERENCES TO RELATED APPLICATIONS

This application is based on Japanese Patent Application (No. 2017-197484) filed on Oct. 11, 2017, the contents of which are incorporated herein by reference.

BACKGROUND OF THE INVENTION

1. Field of the Invention

The present invention relates to a bound stopper to be mounted on a piston rod of a shock absorber for a vehicle, and to a production method therefor.

2. Description of the Related Art

As shown in FIG. 7, in a shock absorber 70 for a vehicle, a bound stopper 75 is mounted on a piston rod 72 of a cylinder. Reference numeral 71 denotes a cylinder body, and reference numeral 73 denotes a spring. The bound stopper 75 is made of an elastic foam molded into a bellows shape. When the shock absorber 70 expands and contracts due to impact and vibration from the road surface, and the cylinder body 71 and the bound stopper 75 collide with each other, the bound stopper 75 is compression deformed, and thereby the impact is mitigated.

Since the collision with the cylinder body and the compression deformation due to the collision are repeated, it is required for the bound stopper 75 that the mechanical strength is high, and the durability against fatigue breaking, settling or the like when heavy load is repeatedly received is excellent.

Conventionally, as a bound stopper which has durability and settling resistance against high load and high deformation and achieves cost reduction, there is proposed a bound stopper constituted by a polyurethane foam which is formed by injecting a urethane raw material having a polyester polyol as a polyol component and diphenylmethane diisocyanate as an isocyanate component into a mold, performing primary vulcanization by heating at 70° C. or higher, thereafter taking out the molded body from the mold, and performing secondary vulcanization by heating, such that a density (Da) and a foam cell diameter (Ra) of a skin layer and a density (Db) and a foam cell diameter (Rb) of a core portion satisfy a specific equation and relationship (JP-A-2015-183832).

SUMMARY OF THE INVENTION

However, since the density (Da) and the foam cell diameter (Ra) of the skin layer and the density (Db) and the foam cell diameter (Rb) of the core portion must satisfy a specific equation and relationship by the primary vulcanization and the secondary vulcanization, there is a problem that the control of the reaction is difficult.

The present invention has been made in view of the above, and an object thereof is to provide a bound stopper, which has high mechanical strength, is excellent in durability against fatigue breaking, settling or the like when a heavy load is repeatedly received, and is easy to be produced, and to provide a production method therefor.

The object of the invention can be achieved by the following constitution.

The first aspect of the invention is a bound stopper which is made of a polyurethane foam and is to be mounted on a piston rod of a shock absorber for a vehicle, the bound stopper comprising:

a polyurethane foam obtained from a polyurethane foam composition containing an isocyanate component and a blowing agent, wherein the isocyanate component contains a urethane prepolymer having an isocyanate group, the urethane prepolymer being obtained from a polyol component, a polyrotaxane containing a cyclic molecule having an active hydrogen group as a constituent, and an isocyanate.

The second aspect of the invention is the bound stopper according to the first aspect above, wherein in the urethane prepolymer having an isocyanate group, an amount of the polyrotaxane is 0.1 part by weight to 6.5 parts by weight based on 100 parts by weight of the polyol component.

The third aspect of the invention is the bound stopper according to the first or second aspect above, wherein the polyurethane foam has a density of 0.3 g/cm$^3$ to 0.6 g/cm$^3$.

The fourth aspect of the invention is a method for procuring a bound stopper which is made of a polyurethane foam and is to be mounted onto a piston rod of a shock absorber for a vehicle, the method comprising:

preparing a urethane prepolymer having an isocyanate group by mixing a polyol component and a polyrotaxane containing a cyclic molecule having an active hydrogen group as a constituent in a molten state, and thereafter blending the mixture with an isocyanate; and injecting a polyurethane foam composition containing the urethane prepolymer having an isocyanate group and a blowing agent into a mold and foaming the same, so as to form the bound stopper made of a polyurethane foam.

The bound stopper of the present invention is constituted by a polyurethane foam obtained from a polyurethane foam composition containing at least a urethane prepolymer having an isocyanate group and a blowing agent. The urethane prepolymer having an isocyanate group is obtained by mixing a polyol component and a polyrotaxane containing a cyclic molecule having an active hydrogen group as a constituent in a molten state, and thereafter blending the mixture with an isocyanate.

As shown in the pattern diagram of FIG. 2, in a polyrotaxane 20, an axis molecule 23 is inserted into open portions of cyclic molecules 21 so as to be in a skewered state, and the axis molecule 23 has a blocking group 25 at both sides. The blocking groups 25 prevent the cyclic molecules 21 from detaching from the axis molecule 23. According to the present invention, when preparing the urethane prepolymer having an isocyanate group, a hydroxyl group of the polyol component and the active hydrogen group in the cyclic molecules 21 of the polyrotaxane 20 react with the isocyanate to form a urethane bond. Thereafter, a polyurethane foam is formed by a foaming reaction between at least the urethane prepolymer having an isocyanate group and the blowing agent, and the bound stopper is obtained from the polyurethane foam.

In the polyrotaxane 20, the cyclic molecules 21 can move freely to some extent along the axis molecule 23. In the polyurethane foam constituting the bound stopper, the urethane bond (a crosslinking point) formed in the portion of the cyclic molecules 21 of the polyrotaxane 20 can also move along the axis molecule 23 (a pulley effect). Even if the heavy load is repeatedly received from the outside, since the received load can be distributed by the pulley effect, the crosslinking point can be prevented from being broken. In addition, in a case where the cyclic molecules 21 approach each other on the axis molecule 23, an air spring effect is found that the cyclic molecules 21 try to keep a distance constant, and the polyurethane foam has excellent restorability due to this air spring effect. Due to these functions, the polyurethane foam of the present invention can improve mechanical strength thereof, reduce the dynamic energy applied externally, and improve the durability against breaking, settling, or the like.

In addition, according to the present invention, since when preparing the urethane prepolymer having an isocyanate group, the polyrotaxane is added to the polyol component in a molten state, and the polyol component and the polyrotaxane are mixed in a molten state, the polyrotaxane can be uniformly dispersed in the polyol component. The mixing of the polyol component and the polyrotaxane is preferably performed at a temperature equal to or higher than a melting point of the polyrotaxane. On the other hand, in a one-shot method in which the polyol component, the blowing agent, the isocyanate component, and the like are mixed at once and injected into the mold, it is necessary to melt the polyrotaxane, which is solid at ordinary temperature, to a temperature equal to or higher than the melting point, or to dissolve or disperse the polyrotaxane into a dispersion medium. However, it is difficult to disperse the polyrotaxane uniformly due to the difference in temperature, viscosity or the like of each component. Further, it is difficult to reliably react all active hydrogen groups of the polyrotaxane, which is an ultra-high molecular weight compound, with the isocyanate component, and the pulley effect and the air spring effect possessed by the polyrotaxane can not be sufficiently obtained, so that it is difficult to obtain the polyurethane foam excellent in mechanical strength and durability.

In the present invention, since it is not necessary to add a dispersion medium such as a surfactant for dispersing the polyrotaxane into the polyurethane foam, it is possible to prevent deterioration in mechanical strength and durability against breaking, settling or the like caused by the dispersion medium of the polyurethane foam. In a case of using compound having no active hydrogen group in the molecule as the dispersion medium, the dispersion medium may cause a deterioration in mechanical strength, bleeding or the like; and in a case of using a compound (monool) containing one active hydrogen group in the molecule as the dispersion medium, the dispersion medium may cause a deterioration in mechanical strength due to a decrease in crosslinking density, or the like.

BRIEF DESCRIPTION OF THE DRAWINGS

FIG. 2 is a pattern diagram showing a structure of a polyrotaxane containing a cyclic molecule having an active hydrogen group as a constituent.

FIG. 5 is a table showing compositions and physical properties of Examples 1 to 10.

FIG. 6 is a table showing compositions and physical properties of Examples 11 to 16 and Comparative Examples 1 to 3.

DESCRIPTION OF REFERENCE NUMERALS AND SIGNS

10 Bound stopper
20 Polyrotaxane containing cyclic molecule having active hydrogen group as constituent
30 Mold
31 Lower mold
33 Middle mold
35 Upper mold

Detailed Description of the Exemplary Embodiments

Figure 1:
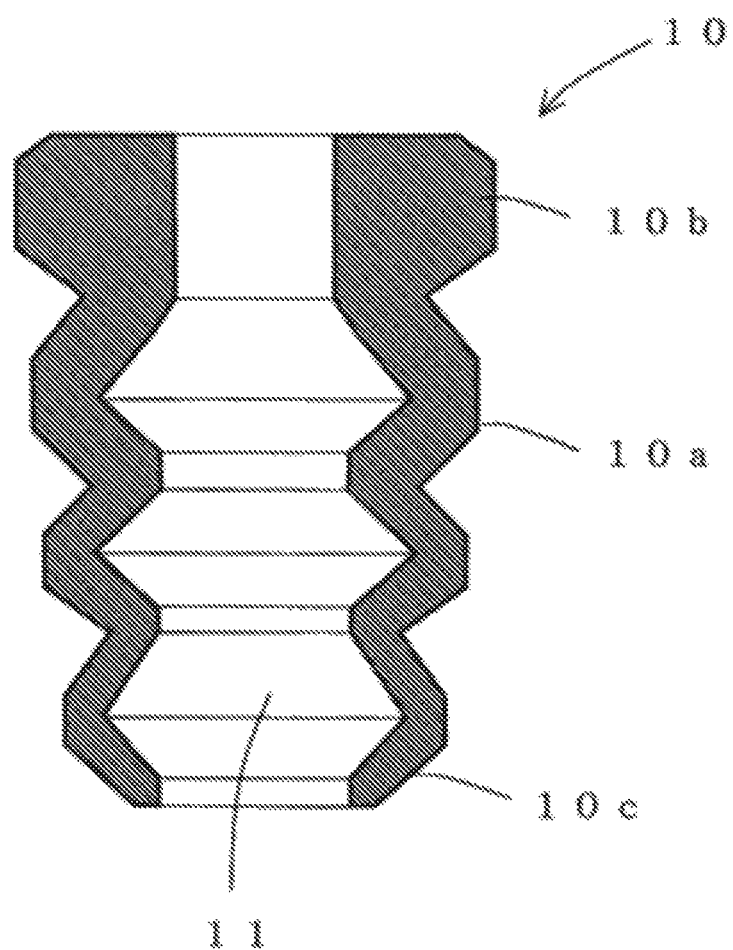
FIG. 1 is a cross sectional view of a bound stopper according to an embodiment of the present invention.
Figure 7:
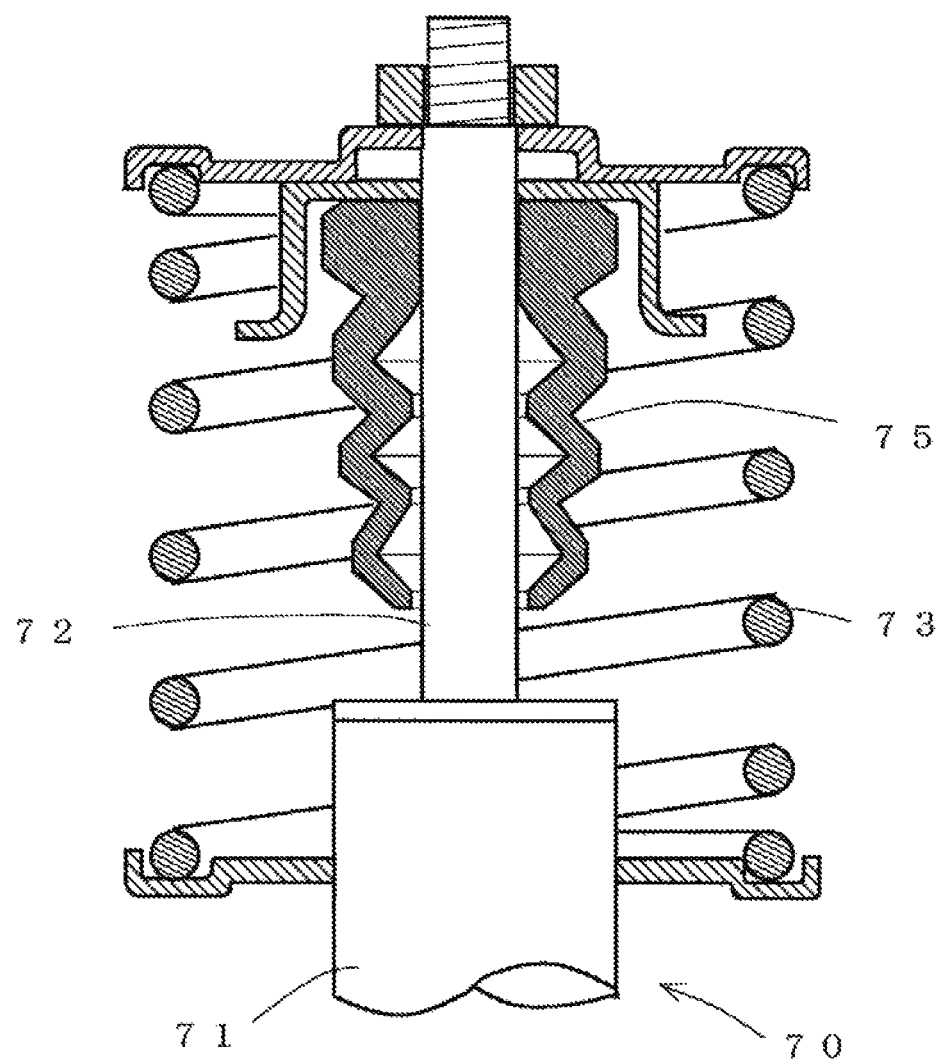
FIG. 7 is a cross sectional view showing a mounted state of the bound stopper.

As shown in FIG. 1, a bound stopper 10 according to an embodiment of the present invention is one mounted on the piston rod 72 of the shock absorber of the vehicle, similar to the bound stopper 75 shown in FIG. 7.

The bound stopper 10 is made of a cylindrical polyurethane foam in which a side outer peripheral surface 10a is formed in a bellows shape. A through hole 11 is formed at a center to be capable of inserting into the piston rod of the shock absorber. The bound stopper 10 is formed in a manner that an upper portion 10b has an outer diameter larger than that of a lower portion 10c. The bound stopper 10 has a length and a diameter set to size corresponding to the shock absorber.

It is preferable that the polyurethane foam constituting the bound stopper 10 has a density (in accordance with JIS K 7222:2005/ISO 845:1988) of 0.3 g/cm$^3$ to 0.6 g/cm$^3$. In a case where the density is less than 0.3 g/cm$^3$, the physical properties of the polyurethane foam are lowered; in contrast, in a case where the density is more than 0.6 g/cm$^3$, the foaming pressure is increased at foam molding of the polyurethane foam and thus the molding becomes difficult.

The polyurethane foam constituting the bound stopper 10 preferably has a tensile strength (in accordance with JIS K 6251:2017/ISO37:2011) of 3.5 MPa or more, more preferably 4.0 MPa or more, and further preferably 4.5 MPa or more, and the upper limit of the tensile strength is preferably 7.0 MPa, more preferably 6.8 MPa, and further preferably 6.5 MPa. The polyurethane foam constituting the bound stopper 10 preferably has an elongation (in accordance with JIS K 6251:2017/ISO37:2011) of 200% or more, more preferably 230% or more, and further preferably 250% or more, and the upper limit of the elongation is preferably 500%, more preferably 480%, and further preferably 450%. The polyurethane foam constituting the bound stopper 10 preferably has a compressive residual strain (in accordance with JIS K6262 A method (test temperature of 70° C.): 2013/ISO815-1:2008) of 20% or less, more preferably 18% or less, and further preferably 15% or less, and the lower limit of the compressive residual strain is preferably 5%.

The polyurethane foam constituting the bound stopper 10 is obtained from a polyurethane foam composition. The polyurethane foam composition contains at least an isocyanate component and a blowing agent.

The isocyanate component includes a urethane prepolymer having an isocyanate group, the urethane prepolymer being obtained from a polyol component, a polyrotaxane containing a cyclic molecule having an active hydrogen group as a constituent, and an isocyanate, and being preferably obtained by mixing a polyol component, and a polyrotaxane containing a cyclic molecule having an active hydrogen group as a constituent in a molten state, and thereafter blending the mixture with an isocyanate.

As the polyol component, either one or both of a known ether-based polyol or ester-based polyol used in production of the polyurethane foam are used.

Examples of the ether-based polyol can include: polyhydric alcohols such as ethylene glycol, diethylene glycol, propylene glycol, dipropylene glycol, butylene glycol, neopentyl glycol, glycerin, pentaerythritol, trimethylolpropane, sorbitol, and sucrose; a polyether polyol obtained by adding an alkylene oxide such as ethylene oxide or propylene oxide to the polyhydric alcohols; or a polyether polyol obtained by ring-opening polymerization of tetrahydrofuran or the like.

Examples of the ester-based polyol can include: a polyester polyol obtained by polycondensation of an aliphatic carboxylic acid such as malonic acid, succinic acid and adipic acid, or an aromatic carboxylic acid such as phthalic acid with an aliphatic glycol such as ethylene glycol, diethylene glycol and propylene glycol; and a polyester polyol obtained by ring-opening polymerization of s-caprolactone or the like.

Particularly in the present invention, as the polyol for the urethane prepolymer having an isocyanate group, a polyester polyol having a weight average molecular weight of 800 to 5000 and a hydroxyl value of 20 mg KOH/g to 200 mg KOH/g is preferred, and a polyester polyol having a weight average molecular weight of 1000 to 3000 and a hydroxyl value of 35 mg KOH/g to 180 mg KOH/g is more preferred.

The polyrotaxane containing the cyclic molecule having an active hydrogen group as a constituent is as shown in the pattern diagram of FIG. 2. The axis molecule 23 is inserted into open portions of the cyclic molecules 21 having an active hydrogen group so as to be in a skewered state, and the blocking group 25 at both ends of the axis molecule 23 prevents detachment of the cyclic molecules 21. Examples of the active hydrogen group of the cyclic molecules 21 can include a hydroxyl group and an amino group, and particularly preferred is a hydroxyl group. It is preferable that the polyrotaxane containing the cyclic molecule having an active hydrogen group as a constituent is one in which the hydroxyl value is 60 mg KOH/g to 100 mg KOH/g, the molecular weight of the axis molecule is 10,000 to 40,000, and the entire molecular weight is 150,000 to 800,000. The amount of polyrotaxane containing the cyclic molecule having an active hydrogen group as a constituent is preferably 0.1 part by weight to 6.5 parts by weight, and more preferably an amount of 0.5 part by weight to 6 parts by weight, based on 100 parts by weight of the polyol component. In a case of less than 0.1 part by weight, the effect of improving the physical properties cannot be obtained. In a case of more than 6.5 parts by weight, the viscosity of the urethane prepolymer is increased excessively, and the molding becomes difficult.

As the isocyanate, a known aromatic isocyanate, alicyclic isocyanate and aliphatic isocyanate used in production of the polyurethane foam are used.

Examples of the aromatic isocyanate include tolylene diisocyanate (IDI), 4,4'-diphenylmethane diisocyanate (MDI), polymeric MDI (crude MDI), xylylene diisocyanate, 1,5-naphthalene diisocyanate (NDI), or the like.

Examples of the alicyclic isocyanate include cyclohexane-1,4-diisocyanate, isophorone diisocyanate, hydrogenated MDI, or the like.

Examples of the aliphatic isocyanate include hexamethylene diisocyanate, isopropylene diisocyanate, methylene diisocyanate, or the like.

Particularly in the present invention, 1,5-naphthalene diisocyanate (NDI) is preferably used as the isocyanate for the urethane prepolymer having an isocyanate group. By using the 1,5-naphthalene diisocyanate (NDI), the durability of the polyurethane foam can be further improved.

The urethane prepolymer having an isocyanate group preferably has an NCO % of 2.5% to 7.5%, more preferably 3% to 7%, and further preferably 4% to 6%. In a case where the NCO % is less than 2.5%, sufficient strength cannot be obtained, and durability is also deteriorated. On the other hand, when the NCO % is more than 7.5%, the flexibility cannot be obtained, and the polyurethane foam becomes hard and brittle, so that the durability is also deteriorated.

The amount of the isocyanate in the preparation of the urethane prepolymer is preferably 1,500 part by weight to 4,000 parts by weight, more preferably 1,800 part by weight to 3,800 parts by weight, and further preferably 2,000 part by weight to 3,500 parts by weight, based on 10,000 parts by weight of the polyol component. The preferable amount of the isocyanate above leads to a preparation of a urethane prepolymer having an isocyanate group, which has a preferable NCO %.

As the blowing agent to be contained in the polyurethane foam composition, water, CFC (Chloro-Fluoro Carbon) substitutes or a hydrocarbon such as pentane can be used alone or in combination. In a case of using water, during the reaction of the isocyanate component, carbon dioxide gas is generated, and foaming occurs due to the carbonic acid gas. The amount of the water as the blowing agent is preferably 0.2 part by weight to 2 parts by weight, based on 100 parts by weight of the urethane prepolymer having an isocyanate group.

The polyurethane foam composition can contain additives such as a catalyst, a surfactant, a hydrolysis resistant agent, a crosslinking agent, a flame retardant, a colorant, a stabilizer, and a filler.

As the catalyst, a known urethanizing catalyst or delayed action catalyst (temperature-sensitive catalyst) can be used in combination. Examples of the urethanizing catalyst include: an amine catalyst such as triethylamine, triethylenediamine, diethanolamine, dimethylaminomorpholine, N-ethyl morpholine, and tetramethylguanidine; a tin catalyst such as stannous octoate and dibutyltin dilaurate; and a metal catalyst (also referred to as organic metal catalyst) such as phenylmercuric propionate or lead octenate. The delayed action catalyst is an amine salt obtained by blocking the active group moiety of the urethanizing catalyst with an acid such as formic acid or octylic acid, and examples thereof can include a phenol salt of diazabicyclo alkene, an octylate salt of diazabicyclo alkene, and a tertiary amine salt.

Any surfactant may be used as long as it is used for the polyurethane foam, and examples thereof include a silicone-based surfactant, a fluorine-containing compound based-surfactant, or the like. If the surfactant is added in preparation of the urethane prepolymer having an isocyanate group, the surfactant is uniformly dispersed in the urethane prepolymer, so that the foam stability can be improved and thus a polyurethane foam having fine and uniform cells can be obtained.

Examples of the hydrolysis resistant agent can include a carbodiimide compound or the like. Particularly, in a case of using a polyester polyol as the polyol component, by adding the hydrolysis resistant agent, the hydrolysis resistance of the polyurethane foam can be improved. Since the carbodiimide group is reactive with the active hydrogen group, it is preferable to add the carbodiimide compound together with the blowing agent in production of the polyurethane foam.

Examples of the crosslinking agent include ethylene glycol, diethylene glycol, propylene glycol, dipropylene glycol, 1,4-butanediol, glycerin, trimethylolpropane, or the like. It is preferable to add the crosslinking agent in preparation of the urethane prepolymer having an isocyanate group; if the crosslinking agent is mixed with the polyol component and the polyrotaxane in a molten state, the crosslinking agent can be uniformly dispersed in the urethane prepolymer.

Examples of the flame retardant can include: halogenated compounds such as polyvinyl chloride, chloroprene rubber, and chlorinated polyethylene; condensed phosphate compounds such as phosphate ester and halogenated phosphate ester; organic compounds such as melamine resin and urea resin; and inorganic compounds such as antimony oxide and aluminum hydroxide. If the flame retardant is added in preparation of the urethane prepolymer having an isocyanate group, the flame retardant can be uniformly dispersed in the urethane prepolymer.

Examples of the colorant can include pigments and dyes. If the colorant is added in preparation of the urethane prepolymer having an isocyanate group, the colorant can be uniformly dispersed in the urethane prepolymer.

Examples of the stabilizer can include an antioxidant, an ultraviolet absorber and a light stabilizer. If the stabilizer is added in preparation of the urethane prepolymer having an isocyanate group, the stabilizer can be uniformly dispersed in the urethane prepolymer.

It is preferable that the isocyanate index (INDEX) of the polyurethane foam composition is 90 to 120. In a case where the isocyanate index is less than 90, the degree of crosslinking is small, sufficient mechanical strength cannot be obtained for the polyurethane foam, and the settling is increased when the repeated load is received; on the other hand, in a case where the isocyanate index is more than 120, the degree of crosslinking is high, the polyurethane foam becomes hard, and the elasticity is lowered.

It is more preferable that the isocyanate index is 95 to 115. The isocyanate index is an index used in the field of the polyurethane foam, and is a numerical value [equivalent of NCO group/equivalent of active hydrogen group×100], which represents an equivalent ratio of isocyanate groups to active hydrogen groups in the polyurethane foam composition in percentage.

The method for producing the bound stopper will be described. The production of the bound stopper includes a step of preparing the urethane prepolymer, a step of injecting the polyurethane foam composition into the mold and foaming the same, and, optionally a demolding step.

In the step of preparing the urethane prepolymer, the polyrotaxane containing the cyclic molecule having an active hydrogen group as a constituent is added to the polyol component that is heated to a predetermined temperature to be in a molten state. The two components are mixed for a predetermined time in a molten state. Thereafter, the isocyanate is added thereto. Then, the polyol component and the active hydrogen group of the cyclic molecule of the polyrotaxane are reacted with the isocyanate to prepare the urethane prepolymer having an isocyanate group.

In order to heat the polyol component and the polyrotaxane to be in a molten state, it is preferable to heat the above components at 60° C. to 120° C., depending on the melting point of the polyol component to be used. The mixing time of the above components in a molten state is preferably 5 minutes to 40 minutes, and more preferably 10 minutes to 30 minutes. When the mixing time is shorter, a dispersibility tends to deteriorate, and when the mixing time is longer, a productivity tends to deteriorate. Even if the polyol component and the polyrotaxane are solid at ordinary temperature, the polyol component and the polyrotaxane can be uniformly dispersed since they are mixed in a molten state.

In order to react the polyol component and the active hydrogen group of the cyclic molecule of the polyrotaxane with the isocyanate by adding the isocyanate, it is preferable to heat the above components at 100° C. to 180° C., depending on the melting point of the isocyanate. The reaction time thereof is preferably 5 minutes to 60 minutes, and more preferably 10 minutes to 40 minutes. When the reaction time is shorter, the reaction (prepolymerization) tends to become insufficient, and when the mixing time is longer, a productivity tends to deteriorate. In a case of NDI, since the melting point thereof is 127° C., it is preferable to heat at 120° C. to 140° C.

In the step of injecting the polyurethane foam composition into the mold and foaming the same, a polyurethane foam composition containing at least the urethane prepolymer having an isocyanate group, the blowing agent and, optionally a suitable additive is injected into the mold and foaming is carried out, so as to form the bound stopper made of a polyurethane foam.

Figure 3A:
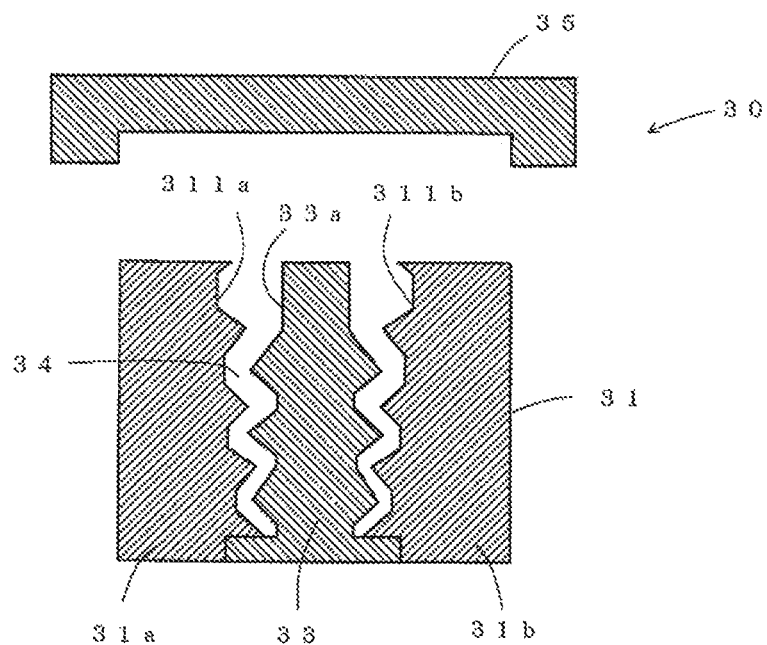
FIG. 3A is a cross sectional view of a mold to be used in production of the bound stopper of the present invention.

The FIG. 3A shows an embodiment of a mold 30 for the bound stopper. The mold 30 includes a lower mold 31, a middle mold 33 and an upper mold 35.

The lower mold 31 can be divided into left and right, a first lower mold 31a and a second lower mold 31b, and includes mold surfaces 311a and 311b forming the side outer peripheral surface 10a of the bound stopper 10.

The middle mold 33 has substantially a bar shape having a mold surface 33a forming the through hole 11 of the bound stopper 10 on the outer periphery thereof, and is disposed between the first lower mold 31a and the second lower mold 31b. The lower mold 31 and the lower mold 33 are combined to form a cavity 34 between the mold surface 311a of the first lower mold 31a and the mold surface 33a of the middle mold 33, and to form a cavity 34 between the mold surface 311b of the second lower mold 31b and the mold surface 33a of the middle mold 33.

Figure 3B:
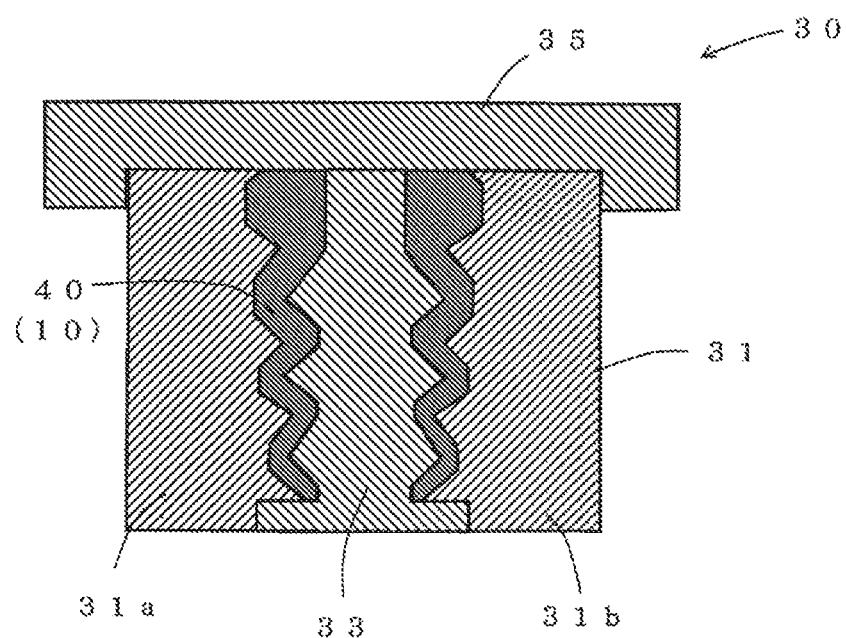
FIG. 3B is a cross sectional view of the mold at foaming.

After the polyurethane foam composition is injected into the cavity 34, as shown in FIG. 3B, the upper mold 35 is covered to close the mold, and a polyurethane foam composition 40 is reacted to foam. After curing (primary curing) by leaving for a predetermined time in a closed mold state, the bound stopper 10 made of a polyurethane foam is formed. As the condition of the primary curing, it is preferable to perform the primary curing at 60° C. to 120° C. for 10 minutes to 120 minutes.

Figure 4:
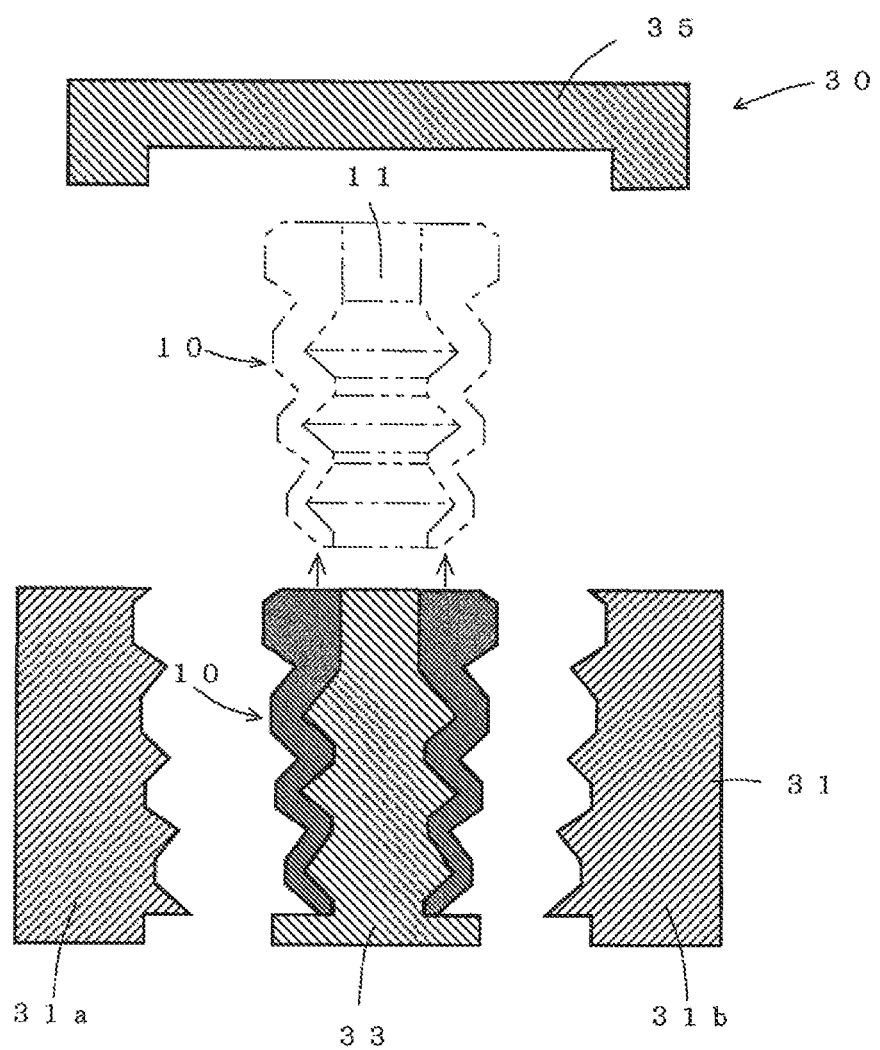
FIG. 4 is a cross sectional view of the mold at demolding in production of the bound stopper of the present invention.

In the demolding step, as shown in FIG. 4, the upper mold 35 is removed, and the first lower mold 31a and the second lower mold 31b are opened to separate the middle mold 33 therefrom. The middle mold 33 separated from the first lower mold 31a and the second lower mold 31b is in a state of being fitted in the through hole 11 of the bound stopper 10 made of the polyurethane foam. Thereafter, the bound stopper 10 is taken out from the middle mold 33 using its elasticity, so as to obtain the bound stopper 10. It is preferable that the bound stopper 10 is subjected to second curing after the demolding. As the condition of the second curing, it is preferable to perform the second curing at 90° C. to 180° C. for 8 hours to 24 hours.

Example

Preparation of Urethane Prepolymer

Polyol 1: polyethylene adipate polyester polyol; molecular weight: 2000; functional group number: 2; hydroxyl value: 56 mg KOH/g; trade name: Polylite OD-X-102 (solid at ordinary temperature) manufactured by DIC Corporation Polyol 2: polytetramethylene ether glycol; molecular weight: 2000; functional group number: 2; hydroxyl value: 56 mg KOH/g; trade name: PTO 2000 (solid at ordinary temperature) manufactured by Hodogaya Chemical Co., Ltd.

Polyrotaxane: polyrotaxane containing a cyclic molecule having an hydroxyl group as a constituent; molecular weight: 180,000; hydroxyl value: 85 mg KOH/g; trade name: Superpolymer SH 1310 P (melting point: about 40° C.) manufactured by Advanced Material Japan.

Isocyanate: 1,5-naphthalene diisocyanate (NDI); NCO %: 40%; trade name: Cosmonate ND (melting point: about 127° C.) manufactured by Mitsui Chemicals, Inc.

The urethane prepolymers having an isocyanate group at the end were prepared as follows, in which the above polyol, polyrotaxane and isocyanate were blended at ratios of Examples 1 to 16 and Comparative Examples 1 to 3 shown in FIGS. 5 and 6. Herein, in Examples 1 to 16, a polyrotaxane was contained in a urethane prepolymer having an isocyanate group at the end, and in Comparative Examples 1 to 3, no polyrotaxane was contained in a urethane prepolymer having an isocyanate group at the end.

To a 20 L metallic reactor, a specified amount of the polyol (preheated to about 100° C. to bring it into a molten state) corresponding to Examples and Comparative Examples was charged. After charging, the polyol was heated at 130° C. and in this state, a specified amount of the polyrotaxane (solid state) corresponding to Example was charged to the reactor. While being kept at 130° C. for 10 minutes, the polyrotaxane was uniformly dispersed in the polyol while being melted. In a state of keeping the reactor at 130° C., a specified amount of the isocyanate (in the case of NDI, a solid state) corresponding to Examples was charged, and was mixed for further 20 minutes. Thereafter, the reactor was allowed to stand at room temperature and gradually cooled, so as to prepare the urethane prepolymer having an isocyanate group at the end. The urethane prepolymer having an isocyanate group at the end of the Comparative Examples was prepared from only a specified amount of the polyol and the isocyanate according to Comparative Examples 1 to 3.

<Preparation of Test Piece>

Test pieces of Examples 1 to 16 and Comparative Examples 1 to 3 were prepared using the prepared urethane prepolymers having an isocyanate group at the end and the following foaming liquid, by a later-described method.

Foaming liquid: water/castor oil=50/50; trade name: Addovat SV manufactured by Rhein Chemie Japan The urethane prepolymer having an isocyanate group at the end temperature-controlled to 80° C. and the foaming liquid temperature-controlled to 40° C. were blended at ratios of Examples 1 to 16 and Comparative Examples 1 to 3 shown in FIGS. 5 and 6, so as to prepare the polyurethane foam composition. After mixing, a specified amount of the polyurethane foam composition was injected into the mold for test piece temperature-controlled to 80° C. The mold for test piece has a cavity of 200 mm×110 mm×30 mm. The injection amounts in Examples and Comparative Examples are shown in FIGS. 5 and 6. The polyurethane foam, which is obtained by foaming in the mold and being subjected to curing (primary curing) at 80° C. for 30 minutes, is demolded. The polyurethane foam after demolding is further subjected to curing (second curing) at 100° C. for 12 hours, so as to obtain the test pieces of Examples 1 to 16 and Comparative Examples 1 to 3.

<Preparation of Product>

Products (bound stoppers) of Examples 1 to 16 and Comparative Examples 1 to 3 were obtained in the same manner as in the preparation of the test pieces, except that product molds (having a cavity capacity of 152 ml) shown in FIGS. 3 and 4 were used and the injection amounts of Example and Comparative Example were used as shown in FIGS. 5 and 6.

In Comparative Example 1, a test piece and a product, which do not contain a polyrotaxane, were prepared using the urethane prepolymer having an isocyanate group at the end and the foaming liquid, the urethane prepolymer being made of only the polyol 1 and the isocyanate.

In each of Comparative Examples 2 and 3, a test piece and a product were prepared using the urethane prepolymer having an isocyanate group at the end, the foaming liquid which were used in Comparative Example 1 without a polyrotaxane, and the polyrotaxane which was temperature-controlled to 80° C. and in a molten state. Namely, in Comparative Examples 2 and 3, the test pieces and products were prepared by blending the polyrotaxane at the same timing as the foaming liquid (so-called one-shot method).

For the test pieces of Examples and Comparative Examples, density, tensile strength, elongation, and compressive residual strain were measured, and the repeated compressive strain was measured for the products. The measurement results are shown in FIGS. 5 and 6

The density was measured using the test piece (200 mm×110 mm×30 mm) as a measurement sample (skin layer is present on all of upper and lower surfaces and side surfaces), in accordance with JIS K 7222:2005/ISO 845: 1988.

A measurement sample of No. 2 dumbbell×thickness 2 mm (skin layer is not present on all of upper and lower surfaces and side surfaces) was prepared from a test piece with slices or the like, and then the tensile strength was measured in accordance with JIS K 6251:2017/ISO 37:2011.

A measurement sample of No. 2 dumbbell×thickness 2 mm (skin layer is not present on all of upper and lower surfaces and side surfaces) was prepared from a test piece with slices or the like, and then the elongation was measured in accordance with JIS K 6251:2017/ISO 37:2011.

A measurement sample of Φ 29×thickness 12.5 mm (skin layer is not present on all of upper and lower surfaces and side surfaces) was prepared, and then the compressive residual strain was measured at a test temperature of 70° C. in accordance with JIS K6262 A method: 2013/ISO 815-1: 2008.

For the repeated compressive strain, the product (bound stopper 10) was inserted into a shaft, and in the inserted product, an upper surface of the upper portion 10b and a lower surface of the lower portion 10c were interposed and fixed by a disc plate. A load cell was set on an upper surface of the disc plate on the upper portion of the product, and compression test was repeatedly applied from a lower surface of the disc plate on the lower portion of the product under a measurement condition of 5 KN×1 HZ. In a case where the number of the compression tests until cracks occur is less than 80,000 times, it was set as "D"; in a case of 80,000 times to less than 90,000 times, it was set as "C";

in a case of 90,000 times to less than 100,000 times, it was set as "B"; and in a case of 100,000 times or more, it was set as "A".

Example 1 was an example of preparing a test piece and a product, in which 10,000 g of the polyol 1, 20 g of the polyrotaxane and 3000 g of the isocyanate were used to prepare a urethane prepolymer having an isocyanate group at the end having an NCO % of 5.98% (theoretical value), 100 g of the urethane prepolymer having an isocyanate group at the end and 2.33 g of the foaming liquid were used to prepare a polyurethane foam composition having an isocyanate index of 110, and the injection amounts to the mold for test piece and the product mold were 330 g and 76 g, respectively. In Example 1, the density was 0.50 g/cm$^3$, the tensile strength was 5.2 MPa, the elongation was 320%, the compressive residual strain was 13%, and the number of the compression tests until the cracks occur was 90,000 times, and it was determined to be "B".

Example 2 was an example similar to Example 1 except that in Example 1, the amount of polyrotaxane was 50 g. the urethane prepolymer having an isocyanate group at the end was prepared having an NCO % of 5.95%, and the amount of foaming liquid was 2.32 g. In Example 2, the density was 0.50 g/cm$^3$, the tensile strength was 5.4 MPa, the elongation was 320%, the compressive residual strain was 12%, and the cracks did not occur even if the compression test in the repeated compressive strain test was performed for 100,000 times or more, and it was determined to be "A".

Example 3 was an example similar to Example 1 except that in Example 1, the amount of polyrotaxane was 100 g. the urethane prepolymer having an isocyanate group at the end was prepared having an NCO % of 5.91%, and the amount of foaming liquid was 2.30 g. In Example 3, the density was 0.50 g/cm$^3$, the tensile strength was 5.5 MPa, the elongation was 330%, the compressive residual strain was 12%, and the cracks did not occur even if the compression test in the repeated compressive strain test was performed for 100,000 times or more, and it was determined to be "A".

Example 4 was an example similar to Example 3 except that in Example 3, 10,000 g of the polyol 2 was used instead of the polyol 1 in Example 3. In Example 4, the density was 0.50 g/cm$^3$, the tensile strength was 5.5 MPa, the elongation was 330%, the compressive residual strain was 12%, and the cracks did not occur even if the compression test in the repeated compressive strain test was performed for 100,000 times or more, and it was determined to be "A".

Example 5 was an example similar to Example 1 except that in Example 1, the amount of polyrotaxane was changed to 300 g, the urethane prepolymer having an isocyanate group at the end was prepared having an NCO % of 5.72%, and the amount of foaming liquid was changed to 2.23 g. In Example 5, the density was 0.50 g/cm, the tensile strength was 5.7 MPa, the elongation was 350%, the compressive residual strain was 12%, and the cracks did not occur even if the compression test in the repeated compressive strain test was performed for 100,000 times or more, and it was determined to be "A".

Example 6 was an example similar to Example 1 except that in Example 1, the amount of polyrotaxane was 500 g, the urethane prepolymer having an isocyanate group at the end was prepared having an NCO % of 5.54%, and the amount of foaming liquid was 2.16 g. In Example 6, the density was 0.50 g/cm$^3$, the tensile strength was 5.9 MPa, the elongation was 360%, the compressive residual strain was 12%, and the cracks did not occur even if the compression test in the repeated compressive strain test was performed for 100,000 times or more, and it was determined to be "A".

Example 7 was an example similar to Example 1 except that in Example 1, the amount of polyrotaxane was 600 g, the urethane prepolymer having an isocyanate group at the end was prepared having an NCO % of 5.45%, and the amount of foaming liquid was 2.12 g. In Example 7, the density was 0.50 g/cm$^3$, the tensile strength was 6.0 MPa, the elongation was 370%, the compressive residual strain was 11%, and the cracks did not occur even if the compression test in the repeated compressive strain test was performed for 100,000 times or more, and it was determined to be "A".

Example 8 was an example similar to Example 3 except that in Example 3, the injection amounts to the mold for test piece and the product mold were changed to 178 g and 41 g. respectively. In Example 8, the density was 0.27 g/cm$^3$, the tensile strength was 3.9 MPa, the elongation was 230%, the compressive residual strain was 18%, and the number of the compression tests until the cracks occur was 85,000 times, and it was determined to be "C".

Example 9 was an example similar to Example 3 except that in Example 3, the injection amounts to the mold for test piece and the product mold were changed to 205 g and 47 g, respectively. In Example 9, the density was 0.31 g/cm$^3$, the tensile strength was 4.6 MPa, the elongation was 280%, the compressive residual strain was 14%, and the number of the compression tests until the cracks occur was 90,000 times, and it was determined to be "B".

Example 10 was an example similar to Example 3 except that in Example 3, the injection amounts to the mold for test piece and the product mold were changed to 264 g and 61 g, respectively. In Example 10, the density was 0.40 g/cm$^3$, the tensile strength was 5.2 MPa, the elongation was 310%, the compressive residual strain was 13%, and the cracks did not occur even if the compression test in the repeated compressive strain test was performed for 100,000 times or more, and it was determined to be "A".

Example 11 was an example similar to Example 3 except that in Example 3, the injection amounts to the mold for test piece and the product mold were changed to 396 g and 91 g, respectively. In Example 11, the density was 0.60 g/cm$^3$, the tensile strength was 5.8 MPa, the elongation was 370%, the compressive residual strain was 10%, and the cracks did not occur even if the compression test in the repeated compressive strain test was performed for 100,000 times or more, and it was determined to be "A".

Example 12 was an example similar to Example 3 except that in Example 3, the amount of isocyanate was 3550 g, the urethane prepolymer having an isocyanate group at the end was prepared having an NCO % of 7.28%, and the amount of foaming liquid was 2.83 g. In Example 12, the density was 0.50 g/cm$^3$, the tensile strength was 4.3 MPa, the elongation was 240%, the compressive residual strain was 14%, and the number of the compression tests until the cracks occur was 85,000 times, and it was determined to be "C".

Example 13 was an example similar to Example 3 except that in Example 3, the amount of isocyanate was 3380 g, the urethane prepolymer having an isocyanate group at the end was prepared having an NCO % of 6.87%, and the amount of foaming liquid was 2.67 g. In Example 13, the density was 0.50 g/cm$^3$, the tensile strength was 5.3 MPa, the elongation was 310%, the compressive residual strain was 12%, and the number of the compression tests until the cracks occur was 90,000 times, and it was determined to be "B".

Example 14 was an example similar to Example 3 except that in Example 3, the amount of isocyanate was 2350 g, the urethane prepolymer having an isocyanate group at the end was prepared having an NCO % of 4.13%, and the amount of foaming liquid was 1.61 g. In Example 14, the density was 0.50 g/cm³, the tensile strength was 5.4 MPa, the elongation was 320%, the compressive residual strain was 12%, and the cracks did not occur even if the compression test in the repeated compressive strain test was performed for 100,000 times or more, and it was determined to be "A".

Example 15 was an example similar to Example 3 except that in Example 3, the amount of isocyanate was 2000 g, the urethane prepolymer having an isocyanate group at the end was prepared having an NCO % of 3.09%, and the amount of foaming liquid was 1.20 g. In Example 15, the density was 0.50 g/cm³, the tensile strength was 5.1 MPa, the elongation was 310%, the compressive residual strain was 13%, and the number of the compression tests until the cracks occur was 90,000 times, and it was determined to be "B".

Example 16 was an example similar to Example 3 except that in Example 3, the amount of isocyanate was 1900 g, the urethane prepolymer having an isocyanate group at the end was prepared having an NCO % of 2.78%, and the amount of foaming liquid was 1.08 g. In Example 16, the density was 0.50 g/cm³, the tensile strength was 4.7 MPa, the elongation was 240%, the compressive residual strain was 15%, and the number of the compression tests until the cracks occur was 85,000 times, and it was determined to be "C".

Comparative Example 1 was an example similar to Example 1 except that only 10,000 g of the polyol 1 and 3000 g of the isocyanate in Example 1 were used to prepare a urethane prepolymer having an isocyanate group at the end having an NCO % of 6.00%, and 100 g of the urethane prepolymer having an isocyanate group at the end and 2.34 g of the foaming liquid were used. In Comparative Example 1, the density was 0.50 g/cm³, the tensile strength was 5.0 MPa, the elongation was 300%, the compressive residual strain was 15%, and the number of the compression tests until the cracks occur was 70,000 times, and it was determined to be "D".

Comparative Example 2 was an example (an example blending the polyrotaxane by the one-shot method) similar to Comparative Example 1 except that in Comparative Example 1, 100 g of the urethane prepolymer having an isocyanate group at the end and 2.34 g of the foaming liquid were blended, and, 0.8 g of the polyrotaxane in a molten state was blended thereto. In Comparative Example 2, the density was 0.50 g/cm³, the tensile strength was 5.0 MPa, the elongation was 300%, the compressive residual strain was 15%, and the number of the compression tests until the cracks occur was 70,000 times, and it was determined to be "D".

Comparative Example 3 was an example similar to Comparative Example 2 except that the polyrotaxane in a molten state in Comparative Example 2 was blended in an amount of 2 g. In Comparative Example 3, the density was 0.50 g/cm³, the tensile strength was 4.9 MPa, the elongation was 290%, the compressive residual strain was 15%, and the number of the compression tests until the cracks occur was 70,000 times, and it was determined to be "D".

As described above, each Example has high mechanical strength (tensile strength and elongation) and is excellent in durability against fatigue breaking, settling (compressive residual strain, repeated compressive strain) or the like when a heavy load is repeatedly received. On contrast, in Comparative Example 1, in which the polyrotaxane is not blended, and Comparative Examples 2 and 3, in which the polyrotaxane is blended by the one-shot method, the durability against fatigue breaking, settling (repeated compressive strain) or the like is poor when a heavy load is repeatedly received.

What is claimed is:

1. A bound stopper which is made of a polyurethane foam and is to be mounted on a piston rod of a shock absorber for a vehicle, the bound stopper comprising:
    a polyurethane foam obtained from a polyurethane foam composition containing an isocyanate component and a blowing agent,
    wherein the isocyanate component contains a urethane prepolymer having an isocyanate group, the urethane prepolymer being obtained from a polyol component, a polyrotaxane containing a cyclic molecule having an active hydrogen group as a constituent, and an isocyanate, and
    the urethane prepolymer having an isocyanate group has an NCO % of 2.5% to 7.5%.

2. The bound stopper according to claim 1, wherein in the urethane prepolymer having an isocyanate group, an amount of the polyrotaxane is 0.1 part by weight to 6.5 parts by weight based on 100 parts by weight of the polyol component.

3. The bound stopper according to claim 1, wherein the polyurethane foam has a density of 0.3 g/cm³ to 0.6 g/cm³.

4. A method for procuring a bound stopper which is made of a polyurethane foam and is to be mounted onto a piston rod of a shock absorber for a vehicle, the method comprising:
    preparing a urethane prepolymer having an isocyanate group by heating and mixing a polyol component and a polyrotaxane containing a cyclic molecule having an active hydrogen group as a constituent in a molten state, and thereafter blending the mixture with an isocyanate; and
    injecting a polyurethane foam composition containing the urethane prepolymer having an isocyanate group and a blowing agent into a mold and foaming the same, so as to form the bound stopper made of a polyurethane foam.

5. The method according to claim 4, wherein the urethane prepolymer having an isocyanate group has an NCO % of 2.5% to 7.5%.

* * * * *